Nov. 17, 1936.   P. OLDS   2,061,248

FLASHLIGHT APPARATUS

Filed Feb. 28, 1933

Phelps Olds
INVENTOR

Frank P. Wentworth
ATTORNEY.

Patented Nov. 17, 1936

2,061,248

UNITED STATES PATENT OFFICE 2,061,248

FLASHLIGHT APPARATUS

Phelps Olds, New York, N. Y.

Application February 28, 1933, Serial No. 658,965

4 Claims. (Cl. 67—29)

The invention relates to flashlight apparatus, and more particularly to a mechanism permitting an effective illumination of the subject to be photographed, and accuracy in the timing of the actuation of the camera shutter and the energizing of the flash bulb.

In a well defined field of flashlight photography, a flash bulb containing a low resistance element is extensively used. These bulbs effect a brilliant illumination over an interval ranging from one thirty-fifth to one-fiftieth of a second, and may be energized by current from a source in which the voltage may vary from one and one-half volts to house lighting voltages. Such bulbs may be effectively used with a battery such as is commonly used with an ordinary hand flashlight.

In flashlight apparatus using such bulbs, the common practice has been to mount this apparatus in its entirety upon the camera box rearwardly of the lens, and to embody in the camera itself, an actuating mechanism controlling the shutter movement and the circuit to the flash bulb. With this arrangement, the light effects upon a subject are determined by the position of the camera and of the flash bulb carried thereby, as determined by the focal distance of the camera from the subject. This imposes a great limitation in the lighting effects secured, and the procuration of artistic photographs with such an apparatus is almost impossible, even when a picture is being taken by an expert photographer. In amateur photography, the quality of the results will be much poorer.

With the above conditions in mind, I have provided a flashlight apparatus using a flash bulb of the character above referred to, wherein it is possible to secure any lighting effect which may be desired, and in which the shutter action may be so accurately timed with relation to the energizing of the flash bulb as to ensure that coincidence of the exposure of the lens of the camera and the full illumination resulting from the energizing of the bulb, as will ensure an effective exposure of the photographic plate or film.

With apparatus embodying the invention, it is possible to illuminate the subject from any angle, and to secure a desired brilliancy of such illumination by bringing the flash bulb any desired distance from the subject, irrespective of the necessary locating of the camera itself to secure a proper focus or the desired artistic effects in the photograph.

The construction of the apparatus is such as to permit it to be readily applied to existing types of cameras and to permit a picture to be taken by a camera held in the hand or mounted upon a tripod or a stand, the camera itself being handled and operated in the usual manner to properly focus the lens and locate the image on the plate or film without likelihood of such accidental movement due to the use of the apparatus in conjunction therewith as will impair the quality of the photograph.

The actuation of apparatus embodying the invention is controlled by a mechanism so constructed as to ensure great accuracy in the timing of the energizing of the flash bulb and of the shutter movement, it being possible to so adjust the parts of this mechanism as to adapt the apparatus to different temperature conditions which may vary the time interval of the flash. These time interval variations are but a small fraction of a second under the most unfavorable circumstances, but adjustments are permitted to adapt the device to even such small time intervals.

The construction of the control device is such that it may be readily disconnected from a camera so as to permit the camera to be used for other than flashlight work.

The invention consists primarily in flashlight apparatus embodying therein the combination with a camera having a shutter, and a mechanical release mechanism therefor having immovable and movable elements, of a support for a flash bulb unconnected with, and movable independently of, said camera, a control device embodying therein, a rigid member having means adjacent one end thereof whereby said immovable element of the release mechanism may be attached thereto, and a switch contact intermediate the ends thereof, a second member having a flexible end adapted to engage the movable element of said shutter release mechanism and a switch contact adapted to cooperate with the contact carried by the rigid member, and a hinge connection between said members, an electrical source, and circuit forming connections between said source and said bulb including therein said switch contacts, and in such other novel features of construction and combination of parts as are hereinafter set forth and described, and more particularly pointed out in the claims hereto appended.

Referring to the drawing.

Like numerals refer to like parts throughout the several views.

Figure 1:
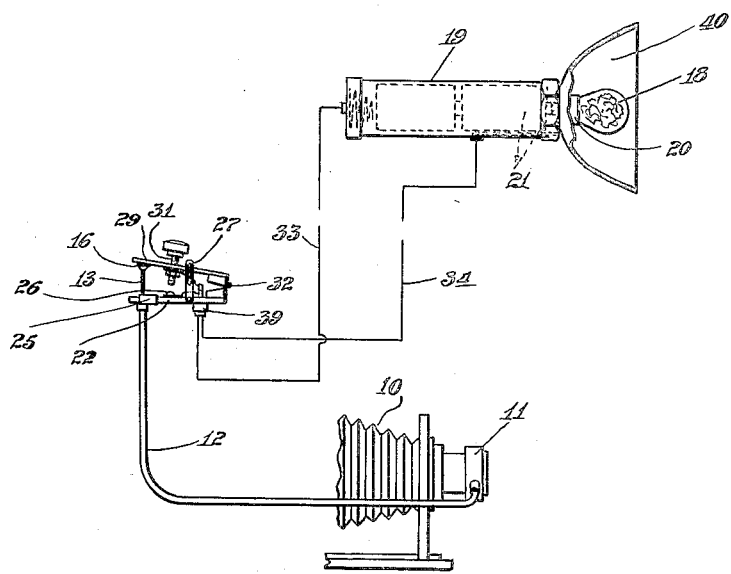
Fig. 1 is a more or less schematic view showing the apparatus of the invention as applied to the lens head of a well known type of camera.
Figure 2:
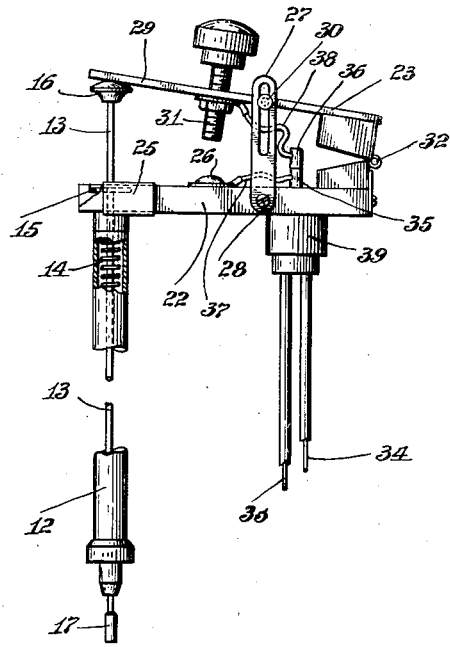
Fig. 2 is a side view of the control mechanism showing a release cable connected therewith.
Figure 3:
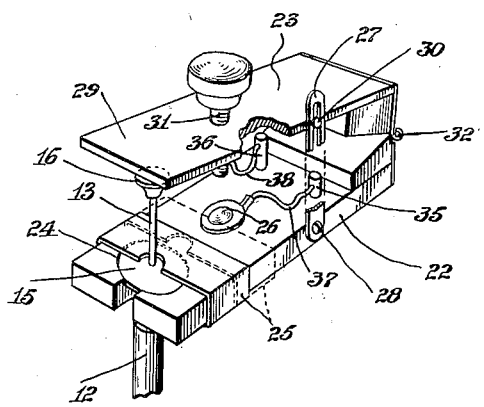
Fig. 3 is a perspective view of said control mechanism.

In the embodiment of the invention shown in the drawing, the camera 10 is provided with a lens head 11 having therein the usual or any desired type of shutter mechanism, actuated by means of a cable release consisting of a sheathing 12 detachably connected with, and immovable in relation to, the lens housing 11; a movable element consisting of a flexible push wire 13 within said sheathing and projecting beyond the opposite ends thereof, and a restoring spring 14 within the sheathing for maintaining said movable element out of engagement with the shutter mechanism. The free end of the sheathing 12 has a flanged fitting 15, and the movable element 13 has an enlarged head 16 adjacent said flange 15 and an enlarged end 17 limiting the action of the spring 14. This construction of release cable is that commonly used in many types of cameras and is described in detail merely because, in the apparatus of the invention, the construction is such as to permit its utilization with cameras having the usual structural characteristics so as to permit a photographer to use the camera with or without the flashlight apparatus.

In combination with a camera embodying the mechanisms above referred to, when it is desired to use the camera in making flashlight pictures, I provide a support for a well known type of flash bulb 18, said support, in the form of the invention shown in Fig. 1, consisting of a tubular battery holder 19 having at one end thereof a socket 20 for the flash bulb. In this embodiment of the invention, one terminal of the bulb is connected directly with one contact terminal of the battery, indicated in dotted lines at 21, and the other terminal of the bulb is connected with the screw threaded socket 20 constituting the other contact co-operating with the bulb. This arrangement is old and well known in the electrical art, and may be varied according to the conditions of use of the apparatus.

The control device consists of two relatively movable members 22 and 23, preferably formed of bakelite, ebonite, wood or any other suitable insulating material. One of these members, 22, embodies a countersunk opening 24 adapted to receive the flanged fitting 15 upon the immovable sheathing 12, and is provided with a sliding collar 25 adapted to engage said flange and hold it in a fixed position in relation to said member 22. Also carried by said member 22 is a switch contact member 26 and a slotted guide plate 27, pivoted at 28.

The other member 23 is provided with a projecting end 29 engageable with the enlarged head 16 of the push wire 13 and with a headed stud 30 movable in the slot in the pivotal plate 27. The member 23 embodies therein a switch contact 31 adapted to co-operate with the switch contact 26 carried by the member 22. The switch contact 31 is preferably in the form of an adjustable screw contact, so that the control mechanism may be so set as to accurately time the operative moment of the release cable in relation to the shutter mechanism and the engagement of the contacts 26 and 31 in relation to said operative moment of the release cable, and if desired, to vary this condition by advancing the timing of the engagement of said contacts in relation to said operative moment of the cable release mechanism.

The timing in the closing of the circuit and of the actuation of the shutter mechanism must be extremely accurate, and the two members 22 and 23 must be so mounted in relation to each other to avoid any such variation in their relative movement as will destroy that accuracy in the timing of the closing of the circuit and of the actuation of the shutter mechanism secured by adjustment of the contacts 26 and 31.

I have found, in actual practice, that the desired accuracy in the operation of the control mechanism may be secured by pivotally connecting these two members at the end thereof opposite to that to which the cable sheathing 12 is attached, by means of an ordinary butt hinge 32, although other means of connecting these sections in relation to each other may be employed, provided that it will ensure the desired reliability in the relative movement of the two parts when actuating the control mechanism.

In the event of the necessity for slightly advancing the contact 31 to ensure the closing of the circuit including the flash bulb 18 in advance of the release of the shutter mechanism, the engagement of said contact 31 with the contact 26 will occur before the completion of the movement of the wire 13 to release the shutter. To ensure the shutter actuation immediately following the closing of the circuit at the contacts 26 and 31, the end 29 thereof should possess sufficient flexibility so that the movement of the wire 13 may be continued following the engagement of said contacts.

While, in the accompanying drawing, I have shown the source for energizing the flash bulb as consisting of a primary electric battery, any source may be relied upon even though it be not contained within the holder for the flash bulb 18. In connection with this source I use flexible circuit forming connections, such as conductor wires 33 and 34, this circuit including therein the bulb 18 and the normally disengaged contacts 26 and 31 of the manually operative control mechanism.

In the embodiment of the invention shown, I complete the electrical connections between said contacts and wires 33—34, by means of contact pins 35 and 36 carried by the member 22, one of which contacts 35 is in electrical connection with the contact 26 by the wire 37, and the other of which contacts 36 is in electrical connection with the contact 31 by the flexible wire 38. Co-operating with the pins 35 and 36 is an ordinary electrical plug 39 connected with the wires 33 and 34 respectively.

The flash bulb support 19 is provided with a reflector 40 having the two-fold function of directing the rays of light from the bulb upon the subject, and serving as a shield in the event that the bulb is positioned at some point in advance of the lens in relation to the subject.

The operation of the herein described apparatus is substantially as follows:—

When it is desired to use a camera in taking flashlight photographs, it is merely necessary to pass the release cable through the slot communicating with the countersunk opening 24, or, through said opening, attach one end of the sheathing 12 to the lens head and move the slide 25 so as to confine the flange 15 within the countersink of said opening. When the parts are so positioned, the spring 14, by engagement with the portion 29 of the member 23, will so position this member as to disengage the contact 31 from the contact 26. The plug 39 is then used to place the contacts 26 and 31 in circuit with the bulb 18 and the source 21.

While only one flash bulb 18 is shown in the drawing, it is obvious that a plurality of such bulbs, included in the same circuit, may be used to increase the illuminating effects. The photographer, by taking the control mechanism in one hand, and after properly focussing the lens upon the subject, may hold the flash bulb support in the other hand and point it towards the subject at any desired angle, either horizontally or vertically to cause the light rays to be so directed as to secure the desired light effects upon the subject.

For example, for outdoor work, if it is desired to secure a photograph of a celebrity, the lighting conditions may be such as to partially shade the face of the subject. With the absolute freedom of the control of the direction of the light rays afforded by the flexible connections 33 and 34 and the length of these connections, the photographer may position the flash bulb rearwardly or in advance of the lens and direct it upwardly and laterally so as to dissipate such shadows when the bulb is energized, or, if desired, the flash bulb may be positioned well in advance of the lens so as to secure an illumination of the subject which will be much more brilliant than would be possible if the flashlight were carried by or positioned close to the camera.

While I have referred to the use of the flash bulb support by the photographer, it is obvious that another person may direct the holder and still have the flashlight under the control of the photographer.

The shutter release cable is ordinarily only a few inches in length, so that the control mechanism will always be immediately accessible to the photographer, although there is no limitation as to the length of cable which may be used.

When the camera has been properly focussed and the holder has been properly positioned to secure the desired lighting effects, it is merely necessary for the photographer to impart relative movement to the two members 22 and 23. Ordinarily, the contact 31 is so set as to engage the contact 26 and close the circuit including the flash bulb 18 substantially simultaneously with the limit of the movement of the wire 13 necessary to the release of the shutter mechanism, so that substantially simultaneously with the opening of the shutter the flash bulb will be energized.

If the energizing of the flash bulb should be even slightly delayed, the rapidity of the shutter movement might result in the partial closing of the shutter before the bulb has attained its maximum illuminating effect. This is apt to occur when a bulb is cold, and for outdoor work during cold weather, it may be desirable to advance the adjustable screw contact 31 very slightly, in order to close the circuit to the bulb the merest fraction of a second in advance of the release of the shutter mechanism by the wire 13. The slight retardation of the shutter movement in relation to the closing of the circuit to the flash bulb will compensate for delay in the development of sufficient resistance to cause the desired maximum illumination of the flash bulb within the time necessary to have the full illumination of the bulb coincident with the full opening of the shutter.

When the screw is so set, the flexibility of the end 29 of the member 23 permits continued movement of the wire 13 following the engagement of the contact 31 with the contact 26.

After the closing of the contacts, the photographer may release pressure upon the members 22 and 23, thus permitting the spring 14, through the wire 13, to impart reverse relative movement to the two members and thus interrupt the circuit at the contacts 26 and 31. A continued engagement of these contacts, however, would have no effect, since the circuit has already been interrupted at the flash bulb 18.

The energy required to actuate the control mechanism is no greater than that ordinarily required to actuate the release cable, and the actuation of this mechanism may follow the practices usually followed when using the cable alone in snapshot work. The guide plate 27 is used merely to avoid a disarrangement in the relation of the plates 22 and 23 as a result of the action of the spring 14 upon the latter, so that the control mechanism is always in condition to be conveniently actuated.

By pivoting the two members 22 and 23 in relation to each other by means of the hinge 32, there can be no variation in the timing of the actuation of the shutter mechanism and the closing of the circuit to the flash bulb 18 as determined by the setting of the contact 31, since the relative pivotal movement of these parts is definite and certain.

The locating of the contacts 26 and 31 intermediate the ends of the hinge members 22 and 23 is desirable as ensuring the relative variation in the length of movement required to actuate the release cable and to engage said contacts.

It is not my intention to limit the invention to the precise details of construction shown in the accompanying drawing, it being apparent that such may be varied without departing from the spirit and scope of the invention.

Having described the invention, what I claim as new and desire to have protected by Letters Patent, is:—

1. Flashlight apparatus embodying therein the combination with a camera having a shutter, and a mechanical release mechanism therefor comprising an immovable sheathing, and a wire movable in said sheathing and projecting beyond opposite ends thereof, of a support for a flash bulb unconnected with, and movable independently of, said camera, a control device embodying therein a rigid member having means adjacent one end thereof whereby said sheathing may be attached thereto, and a switch contact intermediate the ends thereof, a second member having a flexible end adapted to engage the projecting end of said movable wire, and a switch contact adapted to cooperate with the contact carried by the other member, and a hinge connection between said members, an electrical source, and circuit forming connections between said source and said bulb including therein said switch contacts.

2. Flashlight apparatus embodying therein the combination with a camera having a shutter, and a mechanical release mechanism therefor comprising an immovable sheathing having at one end thereof a flanged fitting, and a wire movable in said sheathing and projecting beyond opposite ends thereof, of a support for a flash bulb unconnected with, and movable independently of, said camera, a control device embodying therein two relatively movable members, one of which has a countersunk opening therethrough adapted to receive the flanged fitting of said sheathing, a collar slidably mounted thereon adapted to retain said fitting in said opening, and a switch contact carried thereby, and the other of which members embodies a switch contact adapted to co-operate with the contact carried by said other member and a flexible end engageable with the movable element of said shutter release mechanism, an electrical source, and circuit forming connections between said source and said bulb including therein said switch contacts.

3. Flashlight apparatus embodying therein the combination with a camera having a shutter, and a mechanical release mechanism therefor comprising an immovable sheathing, and a wire movable in said sheathing and projecting beyond opposite ends thereof, of a support for a flash bulb unconnected with, and movable independently of, said camera, a control device embodying therein a rigid member having means adjacent one end thereof whereby said sheathing may be attached thereto, and a switch contact intermediate the ends thereof, a second member having a flexible end adapted to engage the projecting end of said movable wire, and a switch contact adjustably mounted therein and adapted to co-operate with the contact carried by the other member, and a hinge connection between said members, an electrical source, and circuit forming connections between said source and said bulb including therein said switch contacts.

4. Flashlight apparatus embodying therein the combination with a camera having a shutter, and a mechanical release mechanism therefor comprising an immovable sheathing having at one end thereof a flanged fitting, and a wire movable in said sheathing and projecting beyond opposite ends thereof, of a support for a flash bulb unconnected with, and movable independently of, said camera, a control device embodying therein a rigid member having a countersunk opening therethrough adapted to receive the flanged fitting of said sheathing, a collar slidably mounted thereon adapted to retain said fitting in said opening, and a switch contact intermediate the ends thereof, a second member having a flexible end adapted to engage the projecting end of said movable wire, and a switch contact adjustably mounted therein and adapted to co-operate with the contact carried by the other member, a hinge connection between said members, and a slotted plate pivotally connected to each of said members, an electrical source, and circuit forming connections between said source and said bulb including therein said switch contacts.

PHELPS OLDS.